Patented Dec. 8, 1925.

1,564,859

UNITED STATES PATENT OFFICE.

PHILIP A. KOBER, OF HASTINGS-UPON-HUDSON, NEW YORK.

MANUFACTURE OF NEO-ARSPHENAMINE.

No Drawing. Application filed April 12, 1920. Serial No. 373,284.

*To all whom it may concern:*

Be it known that I, PHILIP A. KOBER, a citizen of the United States, residing at Hastings-upon-Hudson, in the county of Westchester, State of New York, have invented certain new and useful Improvements in the Manufacture of Neo-Arsphenamine; and I do hereby declare the following to be a full, clear, and exact description of the invention, such as will enable others skilled in the art to which it appertains to make and use the same.

This invention relates to improvement in the manufacture of neo-arsphenamine, or neo-salvarsan, that is, the formaldehyde-sulfoxylate derivative of the 3-3′-diamino-4-4′-dihydroxy-arseno-benzene.

The sodium salt of arsphenamine has an alkaline reaction. In order to make it neutral or nearly so, the arsphenamine base or salts thereof have been treated with formaldehyde-sulfoxylate to produce the so-called neo-salvarsan or neo-arsphenamine, that is, the formaldehyde sulfoxylate derivative of 3-3′-diamino-4-4′-dihydroxy-arseno-benzene or of the sodium salt thereof, and containing either one or two molecular portions of the formaldehyde sulfoxylate combined with the base.

The formula heretofore proposed for anhydrous neo-arsphenamine calls for an arsenic content of about 32.2 per cent, and it might be expected that, since the formaldehyde-sulfoxylate derivative has been assigned a definite formula and a definite arsenic content, those skilled in the art would produce a pure product corresponding closely with the assigned formula and arsenic content. However, it is a fact that the products obtained by those skilled in the art, and appearing on the market, contain around 38 to 44 per cent of impurities, and have an arsenic content of only around 18 to 20 per cent, instead of the theoretical arsenic content of around 32.2 per cent. This low arsenic content, and a high and fairly constant content of impurities is permitted by the U. S. Hygienic Laboratories, and characterizes the products of both American and foreign manufacturers, so far as I am aware. As a result of the low arsenic content, and the fairly constant impurity contained in the commercial product, the amount of neo-arsphenamine which it is customary to administer is materially higher than the amount of arsphenamine itself, being about 0.9 grams of neo-arsphenamine as compared with about 0.6 grams of ordinary arsphenamine. Among the impurities contained in neo-arsphenamine are alcohol or alcohol combinations and sulphur-containing salts.

I have now found that neo-arsphenamine can be made with an arsenic content closely approximating that of the theoretical formula, and free from alcohol and any appreciable or objectionable amount of sulphur-containing impurities. The improved process of the present invention will be illustrated by the following more detailed description of the preferred practice:

36.6 grams of arsphenamine base are suspended in 400 c. c. of water and solution effected by adding 50 c. c. of twice normal sodium hydroxide. The resulting solution is then treated with 40 grams of formaldehyde-sulfoxylate in 320 c. c. of water, preferably at a temperature below 20° C., and the reaction is permitted to continue over a period of about one-half hour to one hour. Five normal hydrochloric acid is then added until the solution turns Congo paper from red to blue, usually from 40 to 60 c. c. being required. This brings about precipitation of the formaldehyde-sulfoxylate derivative in the form of the free acid. The precipitate is filtered and washed with distilled water.

The press cake obtained as above described is mixed or agitated with the water which it contains, and without further addition of water, to form a thick, uniform paste, and enough saturated sodium carbonate solution is then added to dissolve the greater part of the cake, but without effecting complete solution. That is, a little of the paste is left undissolved, thereby avoiding any excess of free alkali. The resulting solution is filtered through cotton to remove any undissolved or insoluble matter, and is then evaporated under a high vacuum, corresponding to about two to ten millimetres of mercury absolute pressure. The evaporation is advantageously effected at a relatively low temperature, that is, at a water bath temperature of 58 to 80° C., the container in which the evaporation is effected being heated by the water bath at such temperature. The product thus obtained is free from any excess free alkali and is a product of high purity and high arsenic content, closely approximating the theoretical content. It is free from alcohol, either in a free or combined state, and likewise free from any appreciable or objectionable amount of sulphur-containing impurities. Accordingly, the amount of the product which it is sufficient to administer, is correspondingly less than with neo-arsphenamine heretofore commercially available. The product is moreover a stable product well adapted for manufacture and storage, for example, in sealed ampules containing an indifferent gas.

From the foregoing description it will be noted that the improved process of this invention involves the use of a minimum amount of water during the production of the sodium salt of the formaldehyde-sulfoxylate derivative, so that a minimum amount of water is required to be evaporated during the vacuum evaporation. Any objectionable decomposition and formation of toxic by-product is thereby avoided, and a product of the desired high purity and high arsenic content is obtained.

I claim:

1. In a method of producing neo-arsphenamine wherein arsphenamine base is converted into a formaldehyde-sulfoxylate derivative, and the latter is precipitated and filtered off from the reaction mixture, the step of mixing the precipitate with a strong sodium carbonate solution while avoiding excess of free alkali, and evaporating the resulting solution under a vacuum of from about 2 to 10 mm. of mercury, absolute pressure.

2. The method of producing neo-arsphenamine, which comprises subjecting the formaldehyde-sulfoxylate derivative of arsphenamine to the action of a concentrated sodium carbonate solution, avoiding an excess of free alkali, and evaporating the resulting solution to dryness under a vacuum which will produce evaporation at a relatively low temperature.

3. The method of producing neo-arsphenamine, which comprises treating the formaldehyde-sulfoxylate derivative of arsphenamine with insufficient sodium carbonate to effect complete solution, thereby avoiding an excess of alkali, filtering the resulting solution, and evaporating the solution to dryness under a vacuum of from about 2 to 10 mm. of mercury absolute pressure.

4. In a method of producing neo-arsphenamine wherein an alkaline solution of arsphenamine base is treated with formaldehyde sulfoxylate and the resulting product is precipitated with an acid, and filtered off, the step of mixing the precipitate with a concentrated alkaline solution to effect solution thereof without excess alkali, and concentrating the resulting solution under a vacuum which will produce evaporation at a relatively low temperature.

5. The method of producing neo-arsphenamine, which comprises subjecting a solution of the formaldehyde sulfoxylate derivative of arsphenamine base in an alkali, and free from excess of alkali, to evaporation to dryness under a vacuum of from about 2 to 10 mm. of mercury absolute pressure.

6. As a new product, neo-arsphenamine in the form of the sodium salt of the formaldehyde-sulfoxylate derivative of arsphenamine, said product being substantially free from alcohol and sulphur-containing impurities, and containing approximately the theoretical arsenic content.

In testimony whereof I affix my signature.

PHILIP A. KOBER.